Oct. 19, 1954
D. B. DOOLITTLE ET AL
2,692,101
HYDROSKI AND FLOAT AIRCRAFT TAKE-OFF AND LANDING RAMP
Filed March 24, 1950
2 Sheets-Sheet 1
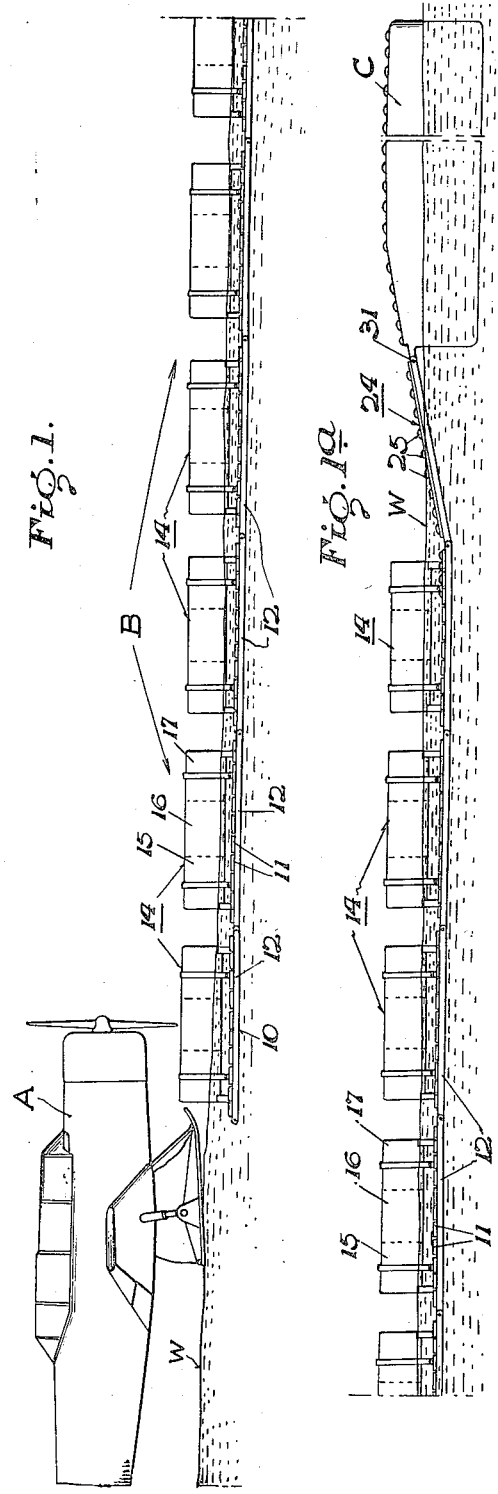
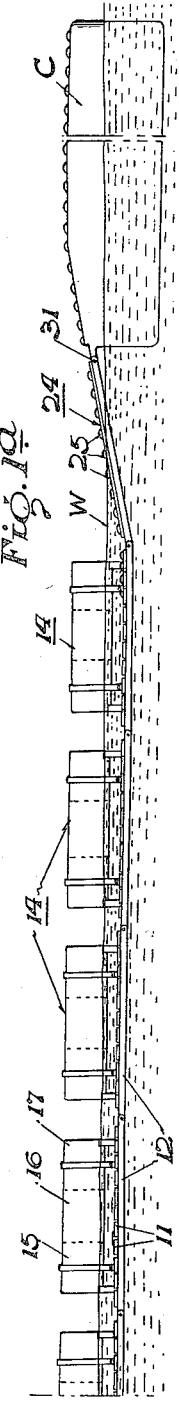
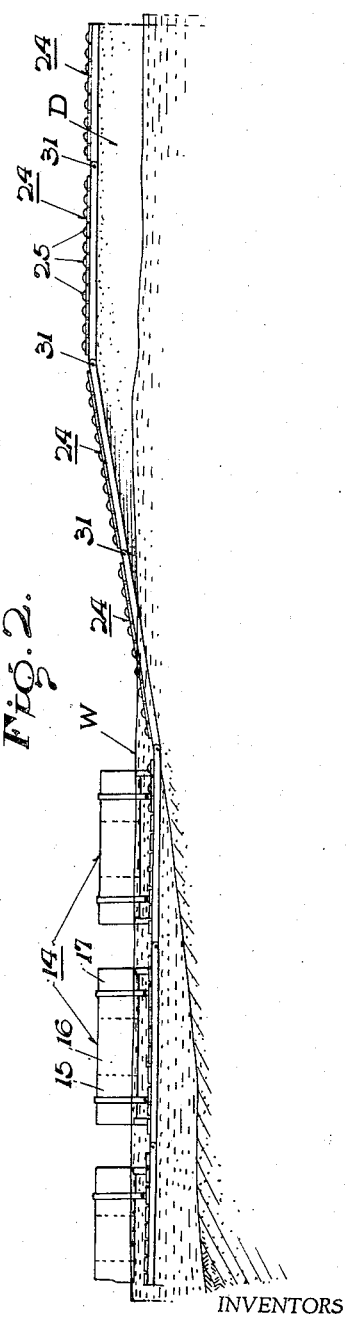
INVENTORS
Donald B. Doolittle
Jack R. Walden.
BY Herbert M. Birch
ATTORNEY Oct. 19, 1954
D. B. DOOLITTLE ET AL
2,692,101
HYDROSKI AND FLOAT AIRCRAFT TAKE-OFF AND LANDING RAMP
Filed March 24, 1950
2 Sheets-Sheet 2
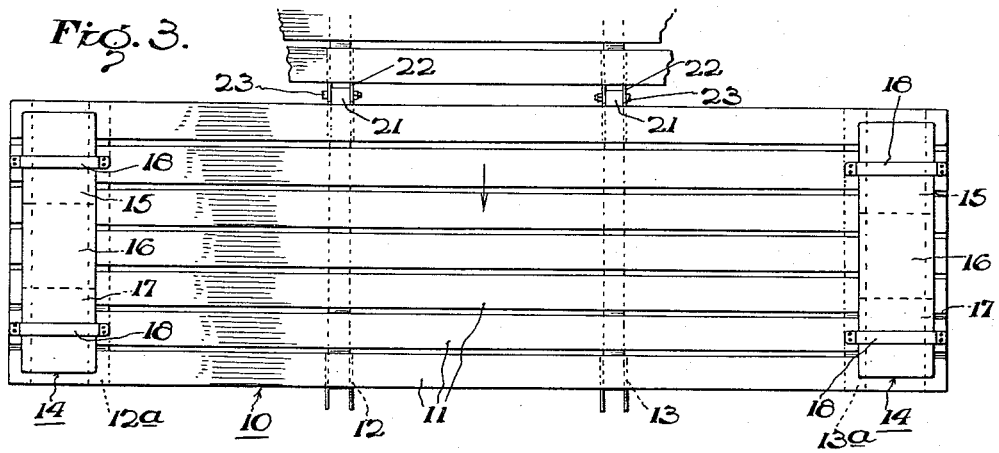
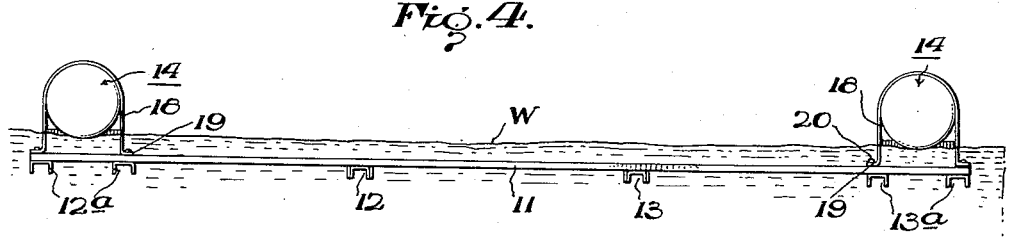
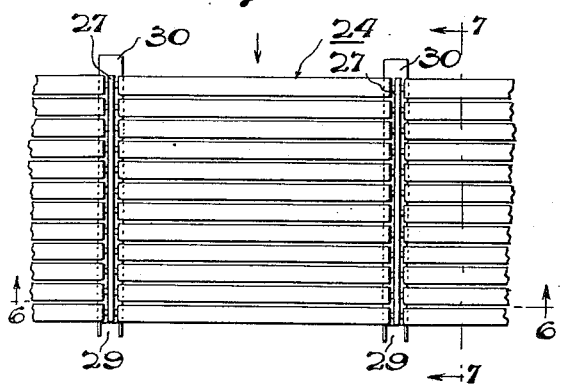
INVENTORS
Donald B. Doolittle
Jack R. Walden.
BY Herbert M. Birch
ATTORNEY Patented Oct. 19, 1954

2,692,101

UNITED STATES PATENT OFFICE 2,692,101

HYDROSKI AND FLOAT AIRCRAFT TAKE-OFF AND LANDING RAMP

Donald B. Doolittle and Jack R. Walden, Wilmington, Del., assignors, by mesne assignments, to All American Engineering Company, Wilmington, Del., a corporation of Delaware Application March 24, 1950, Serial No. 151,684

2 Claims. (Cl. 244—114)

The present invention relates to aircraft launching and landing methods and apparatus, and more particularly for hydro-ski equipped aircraft.

While a principal object of this invention relates to a novel launching and landing method and apparatus for aircraft equipped with ski landing gear, it also has utility for launching and landing many kinds of hydro-craft.

Another object is to provide novel partially submerged runways for launching and landing either sea or land based airplanes having hydro-ski equipped undercarriages.

A further object is to provide a train of connected partially submerged floating runway members adapted to be controlled for depth of submergence.

Still another object is to provide landing means for hydro-ski equipped aircraft for landings and take-offs from substantially any surface medium such as, beaches, marshy ground, or on mid-ocean structures.

With these and other objects in view which will become apparent as the invention is fully understood, the same resides in the novelty of construction, combination and arrangement of elements hereinafter specifically described and distinctly claimed in the appended claims.

The description should be read in connection with the accompanying drawings wherein:

Figure 1 is a side elevation view of a train of the present invention runway sections shown partially submerged with a plane about to taxi forward along the same to land.

Figure 1a is a continuation of the runway train showing the leading end of the train connected with an aircraft based float structure.

Figure 2 is another arrangement of the arrangement of Figure 1a showing a beach or other landing surface blanked with sections of the runway unit with the floats removed from the beach supported units from a desired point in the runway train.

Figure 3 is a complete top plan view of one of the runway units and a fragmental part of another connected runway unit illustrating a form of connection that may be used.

Figure 4 is an end view of one of the runway units showing the same held partially submerged by its float members.

Figure 5 is a top plan view of one section of landing mat, runway unit or the like, such as may be based on the float structure or the sloping beach illustrated in Figures 1a and 2, respectively.

Figure 6 is a cross section view taken along the line 6—6 of Figure 5.

Figure 7 is a cross section view taken along the line 7—7 of Figure 5.

Referring in detail to the several views, there is shown in Figure 1 a hydro-ski equipped airplane A, which has landed on a water surface W and is being taxied forward to the submerged leading ramp or runway unit 10 of a train B of such submerged floating units. Each of these ramp or runway units 10 are identical and comprise a plurality of slats or bars 11 preferably arranged in spaced parallel relation to provide an open flooring for facilitating the submergence of these ramps below the water line W. These bars are held together by elongated brace and connecting members, such as the angle irons 12 and 13, which extend transversely under, across and slightly beyond the side of each ramp unit. The slats or bars 11 may be secured by bolts, rivets, or welding, depending upon whether the same are of wood or metal. Also, at each end of the slots 11 are spaced brace members 12a and 13a, Fig. 4.

At each end of each ramp unit over braces 12a and 13a are mounted compartmented floatation tanks 14 for adjusting the floating submergence of the units relative to the water level W. Obviously, submergence adjustment is desirable and must be calculated for best results according to no load and probable load conditions, developing when aircraft are using the runway. For example, total buoyancy of the ramp units 10 should support the weight of an airplane without an excessive water level. Buoyancy of the tanks is controlled by partially flooding the compartments 15, 16 and 17 thereof, thereby in turn controlling and regulating the desired depth of water over the bars of the ramp floor.

As best illustrated in Figures 3 and 4, the buoyancy control tanks 14 are secured to the ends of the ramp units 10 by flexible metal straps 18 bent into feet portions 19 and anchored to the slats 11 by fasteners 20.

The brace and connecting members 12 and 13, as hereinbefore stated, extend beyond each side of each ramp unit 10. These extensions are bifurcated and serve as train couplings. They are arranged in spaced apart parallel pairs on each side of each unit 10, for example, 21—21 and 22—22, see Figure 3. The bifurcated couplings 21—21 are slightly less in width than the couplings 22—22 so each coupling 21 may nest within each coupling 22 and be pivotally coupled together by a transverse pivot bolt 23. This gives flexibility to the train B, thereby permitting proper connection thereof to the float or beach ramp units 24.

The ramp units 24 are constructed of elongated hollow rollers 25 formed with end projecting axles 26. These axles extend through the rollers and the opposite aligned openings formed in spaced apart elongated fins 27 support the axle ends. These fins are formed from the top surface of angle irons 28 having apertured bifurcated coupling ends 29—29 and apertured ends 30—30 extending from the opposite side of each ramp unit 24.

Each of the ramp units 24 couple together in a manner similar to the units 10 by bolts 31 and as shown in Figure 1a connect to a float structure C with a roller surface, or as in Figure 2 the units 24 are in a train leading from below the water line W upward over a beach D or the like. This arrangement of ramp units is very efficient for use on tide water beaches.

Thus there has been discovered and developed a novel method of landing and take-off for aircraft which includes equipping the same with hydro-skis, preferably metal, see Figure 1. An aircraft equipped with these skis may land and take-off with much greater rapidity than heretofore known and will not sink below the water surface as long as a predetermined taxi speed is maintained after contacting the water surface. After taxiing over the open water surface onto the connected train of landing ramps, it is safe to stop the motion of the airplane completely without danger of sinking.

Also, a continued forward movement of the aircraft results in the same planing upward over the roller ramp units 24 onto the float structure C or onto the beach D.

With this novel take-off and landing method either beach based or water based airplanes may land or take-off in relatively much less time than by any heretofore known methods. This greater rapidity in take-off and landing is of vital importance during military maneuvers.

Any arrangement and method for controlling the buoyancy of the tanks 14 by letting in or discharging water from their respective compartments as determined by the weight of the aircraft using the ramps may be used. When using the ramps with a floating structure C, which may be any suitable form of powered boat or the like, the system is made mobile and thereby further speeds up maneuvers.

Without further description it is believed that the inventive concepts of the present novel method and apparatus should be reasonably clear to others skilled in the art. Although only two embodiments of the apparatus are illustrated and described in connection with the novel landing and take-off methods, it is to be expressly understood that the invention is not limited thereto. For example, various changes may be made in the elements and the combination and arrangements thereof within the present inventive concepts, as will now be likely to occur to others skilled in the art. For a definition of the limits of the invention, reference should be had to the appended claims.

What is claimed is:

1. A runway for non-floatable aircraft equipped with an undercarriage with planing surfaces for various surface mediums including water, said runway comprising a train of submerged substantially level smooth surfaces, said level surfaces being rigid and maintained at a set predetermined depth below a water surface, and floatation units secured to the respective upper end surfaces of each submerged surface, each of said units being made with a plurality of ballast compartments adapted to control the depth of float on the water surface above their respective submerged surfaces to provide a water planing surface between the units, whereby said submerged surfaces will support the aircraft planing surfaces when an aircraft thus equipped is at rest thereon.

2. A runway for non-floatable aircraft equipped with an undercarriage with planing surfaces for various surface mediums including water, said runway comprising a plurality of detachably and flexibly coupled submerged substantially level smooth surfaces, said level surfaces being maintained at a predetermined depth below a water surface, and floatation units secured to the respective upper end surfaces of each submerged surface, each of said units being made with a plurality of ballast compartments adapted to control the depth of the float on the water surface above their respective submerged surfaces to provide a water planing area between the units, whereby said submerged surfaces will support the aircraft planing surfaces when an aircraft thus equipped is at rest thereon.

References Cited in the file of this patent

UNITED STATES PATENTS

| Number | Name | Date |
|---|---|---|
| 171,722 | Gorringe | Jan. 4, 1876 |
| 464,962 | Flynn | Dec. 15, 1891 |
| 1,073,794 | Christensen | Sept. 23, 1912 |
| 1,751,639 | Junkers | Mar. 25, 1930 |
| 1,752,894 | Degn | Apr. 1, 1930 |
| 1,811,321 | Kiwull | June 23, 1931 |
| 1,870,115 | Hein | Aug. 2, 1932 |
| 2,020,324 | Myers | Nov. 12, 1935 |
| 2,145,459 | Rhines | Jan. 31, 1939 |
| 2,160,449 | Weichardt | May 30, 1939 |
| 2,340,080 | Ringnel | Jan. 25, 1944 |
| 2,586,218 | Gazda | Feb. 19, 1952 |

FOREIGN PATENTS

| Number | Country | Date |
|---|---|---|
| 135,531 | Great Britain | Dec. 4, 1919 |
| 317,784 | Great Britain | July 3, 1930 |
| 553,010 | Great Britain | May 4, 1943 |
| 488,235 | Germany | Dec. 21, 1929 |
| 734,312 | France | July 26, 1932 |